United States Patent
Sakatsume et al.

(10) Patent No.: US 10,522,291 B2
(45) Date of Patent: Dec. 31, 2019

(54) MULTILAYER CERAMIC CAPACITOR AND MANUFACTURING METHOD OF MULTILAYER CERAMIC CAPACITOR

(71) Applicant: TAIYO YUDEN CO., LTD., Taito-ku, Tokyo (JP)

(72) Inventors: Katsuo Sakatsume, Takasaki (JP); Masumi Ishii, Takasaki (JP); Takeshi Nosaki, Takasaki (JP); Norihiro Arai, Takasaki (JP); Jyouji Ariga, Takasaki (JP); Yasushi Inoue, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/457,287

(22) Filed: Mar. 13, 2017

(65) Prior Publication Data

US 2017/0345570 A1    Nov. 30, 2017

(30) Foreign Application Priority Data

May 31, 2016  (JP) .................................. 2016-109211

(51) Int. Cl.
*H01G 4/232* (2006.01)
*H01G 4/30* (2006.01)
(Continued)

(52) U.S. Cl.
CPC ............ *H01G 4/30* (2013.01); *H01G 4/1236* (2013.01); *H01G 4/2325* (2013.01); *H01G 4/012* (2013.01)

(58) Field of Classification Search
CPC .... H01G 4/012; H01G 4/2325; H01G 4/1236; H01G 4/30
See application file for complete search history.

(56) References Cited

U.S. PATENT DOCUMENTS

| 4,701,827 A | * | 10/1987 | Fujikawa | ............. | H01G 4/2325 |
| | | | | | 361/309 |
| 5,536,293 A | * | 7/1996 | Yamamoto | ................ | C03C 8/18 |
| | | | | | 204/292 |

(Continued)

FOREIGN PATENT DOCUMENTS

| JP | S5874030 A | 5/1983 |
| JP | 2001274035 A | 10/2001 |

(Continued)

OTHER PUBLICATIONS

Non-Final Office Action issued by U.S. Patent and Trademark Office, dated Sep. 25, 2018, for copending U.S. Appl. No. 15/457,214.

(Continued)

*Primary Examiner* — David M Sinclair
(74) *Attorney, Agent, or Firm* — Law Office of Katsuhiro Arai

(57) ABSTRACT

A multilayer ceramic capacitor includes: a ceramic multilayer structure having ceramic dielectric layers and internal electrode layers alternately stacked, the internal electrode layers being mainly composed of a transition metal other than an iron group, end edges of the internal electrode layers being alternately exposed to a first end face and a second end face; and a pair of external electrodes provided on the first end face and the second end face, wherein the external electrode includes a base conductive layer that includes glass of less than 7 weight % and is mainly composed of a transition metal other than an iron group or a noble metal, and a first plated film that covers the base conductive layer, has a thickness that is half of a thickness of the base conductive layer or more and is mainly composed of a transition metal other than an iron group.

1 Claim, 5 Drawing Sheets

(51) Int. Cl.
*H01G 4/12* (2006.01)
*H01G 4/012* (2006.01)

(56) References Cited

U.S. PATENT DOCUMENTS

| | | | |
|---|---|---|---|
| 5,781,402 A * | 7/1998 | Fujiyama | B22F 1/0007 |
| | | | 361/305 |
| 5,877,934 A * | 3/1999 | Sano | C04B 35/4682 |
| | | | 361/312 |
| 6,051,516 A | 4/2000 | Mizuno et al. | |
| 2001/0032737 A1 | 10/2001 | Taira | |
| 2005/0184278 A1* | 8/2005 | Miki | H01B 1/16 |
| | | | 252/500 |
| 2005/0260410 A1 | 11/2005 | Fujikawa et al. | |
| 2006/0193103 A1* | 8/2006 | Yoshii | H01G 4/008 |
| | | | 361/306.3 |
| 2007/0009719 A1 | 1/2007 | Naito et al. | |
| 2008/0081200 A1 | 4/2008 | Katsube et al. | |
| 2008/0112109 A1 | 5/2008 | Muto et al. | |
| 2009/0046410 A1* | 2/2009 | Takeoka | C04B 35/48 |
| | | | 361/321.4 |
| 2012/0162856 A1 | 6/2012 | Lee et al. | |
| 2012/0188682 A1 | 7/2012 | Sato et al. | |
| 2013/0050896 A1 | 2/2013 | Park et al. | |
| 2013/0134836 A1 | 5/2013 | Hwang et al. | |
| 2013/0201602 A1 | 8/2013 | Takeoka | |
| 2014/0002949 A1 | 1/2014 | Gu et al. | |
| 2014/0292142 A1* | 10/2014 | Nishisaka | C03C 8/18 |
| | | | 310/311 |
| 2014/0347783 A1* | 11/2014 | Kisumi | H01B 1/22 |
| | | | 361/301.4 |
| 2015/0090485 A1* | 4/2015 | Lee | H01G 2/065 |
| | | | 174/260 |
| 2016/0095223 A1* | 3/2016 | Yoshida | H01G 4/2325 |
| | | | 174/260 |
| 2016/0254094 A1 | 9/2016 | Lee et al. | |
| 2017/0345568 A1 | 11/2017 | Sakatsume et al. | |

FOREIGN PATENT DOCUMENTS

| | | | | |
|---|---|---|---|---|
| JP | 2003077755 A | | 3/2003 | |
| JP | 2006013219 A | * | 1/2006 | ............... H01G 4/12 |
| JP | 2009141292 A | * | 6/2009 | |
| JP | 2009184841 A | | 8/2009 | |
| JP | 2012079864 A | * | 4/2012 | |
| JP | 2012138579 A | | 7/2012 | |
| JP | 2012164966 A | | 8/2012 | |
| JP | 2012182355 A | | 9/2012 | |
| JP | 2013048231 A | | 3/2013 | |
| JP | 2013115424 A | | 6/2013 | |
| JP | 2014011449 A | | 1/2014 | |
| JP | 2014207254 A | | 10/2014 | |
| WO | 2012043427 A1 | | 4/2012 | |

OTHER PUBLICATIONS

Final Office Action issued by U.S. Patent and Trademark Office, dated Jul. 20, 2018, for related U.S. Appl. No. 15/457,214.
A Notification of Reasons for Refusal issued by the Japanese Patent Office, dated Jan. 29, 2019, for related Japanese application No. 2016-109211.
A Notification of Reasons for Refusal issued by the Japanese Patent Office, dated Dec. 18, 2018, for related Japanese application No. 2016-109160.
Office Action issued by U.S. Patent and Trademark Office, dated Jan. 18, 2019, for related U.S. Appl. No. 15/457,214.
Non-Final Office Action issued by U.S. Patent and Trademark Office, dated Jun. 20, 2019, for copending U.S. Appl. No. 15/457,214 (38 pages).
A Notification of Decision of Refusal issued by the Japanese Patent Office, dated May 14, 2019, for Japanese counterpart application No. 2016-109160. (3 pages).

* cited by examiner

FIG. 3

| | SHAPE LENGTH WIDTH (mm) | ELECTRO-STATIC CAPACITANCE (pF) (1MHz) | BASE CONDUCTIVE LAYER | | | 1ST PLATED FILM | | 2ND PLATED FILM | | Q VALUE | | | QUALITY OF HIGH FREQUENCY CHARACTERISTIC | SEAL PROPERTY OF ELECTRODE | QUALITY OF PLATING | QUALITY OF MOUNTING |
|---|---|---|---|---|---|---|---|---|---|---|---|---|---|---|---|---|
| | | | MATERIAL | THICKNESS (μm) | GLASS (PART) | MATERIAL | THICKNESS (μm) | MATERIAL | THICKNESS (μm) | 1 GHz | 2 GHz | 3 GHz | | | | |
| EXAMPLE 1 | 0402 | 2 | Cu | 4 | 3<br>5<br>6 | Cu | 4 | Sn | 2.5 | 480 | 160 | 85 | ○ | △<br>○<br>○ | ○<br>○<br>○ | ○<br>○<br>○ |
| EXAMPLE 2 | 0402 | 2 | Cu | 4 | 3<br>5<br>6 | Cu | 3 | Sn | 2.5 | 480 | 160 | 85 | ○ | △<br>○<br>○ | ○<br>○<br>○ | ○<br>○<br>○ |
| EXAMPLE 3 | 0402 | 2 | Cu | 4 | 3<br>5<br>6 | Cu | 2 | Sn | 2.5 | 480 | 160 | 85 | ○ | △<br>○<br>○ | ○<br>○<br>○ | ○<br>○<br>○ |
| EXAMPLE 4 | 0402 | 2 | Cu | 6 | 3<br>5<br>6 | Cu | 6 | Sn | 2.5 | 480 | 160 | 85 | ○ | △<br>○<br>○ | ○<br>○<br>○ | ○<br>○<br>○ |
| EXAMPLE 5 | 0402 | 2 | Cu | 6 | 3<br>5<br>6 | Cu | 4 | Sn | 2.5 | 480 | 160 | 85 | ○ | △<br>○<br>○ | ○<br>○<br>○ | ○<br>○<br>○ |
| EXAMPLE 6 | 0402 | 2 | Cu | 6 | 3<br>5<br>6 | Cu | 3 | Sn | 2.5 | 480 | 160 | 85 | ○ | △<br>○<br>○ | ○<br>○<br>○ | ○<br>○<br>○ |
| EXAMPLE 7 | 0603 | 2 | Cu | 10 | 3<br>5<br>6 | Cu | 10 | Sn | 2.5 | 530 | 190 | 95 | ○ | △<br>○<br>○ | ○<br>○<br>○ | ○<br>○<br>○ |
| EXAMPLE 8 | 1005 | 2 | Cu | 10 | 3<br>5<br>6 | Cu | 7 | Sn | 2.5 | 540 | 200 | 95 | ○ | △<br>○<br>○ | ○<br>○<br>○ | ○<br>○<br>○ |
| EXAMPLE 9 | 1608 | 2 | Cu | 10 | 3<br>5<br>6 | Cu | 5 | Sn | 2.5 | 560 | 220 | 90 | ○ | △<br>○<br>○ | ○<br>○<br>○ | ○<br>○<br>○ |
| EXAMPLE 10 | 0402 | 2 | Cu | 4 | 3<br>5<br>6 | Cu | 6 | Sn | 2.5 | 480 | 160 | 85 | ○ | △<br>○<br>○ | ○<br>○<br>○ | ○<br>○<br>○ |
| EXAMPLE 11 | 0402 | 2 | Cu | 6 | 3<br>5<br>6 | Cu | 8 | Sn | 2.5 | 480 | 160 | 85 | ○ | △<br>○<br>○ | ○<br>○<br>○ | ○<br>○<br>○ |

FIG. 4

| | SHAPE LENGTH WIDTH (mm) | ELECTRO-STATIC CAPACI-TANCE (pF) (1MHz) | BASE CONDUCTIVE LAYER | | | 1ST PLATED FILM | | 2ND PLATED FILM | | Q VALUE | | | QUALITY OF HIGH FREQUENCY CHARACTE-RISTIC | SEAL PROPER-TY OF ELECT-RODE | QUALITY OF PLATING | QYALITY OF MOUN-TING |
|---|---|---|---|---|---|---|---|---|---|---|---|---|---|---|---|---|
| | | | MATE-RIAL | THICK-NESS (μm) | GLASS (PART) | MATE-RIAL | THICK-NESS (μm) | MATE-RIAL | THICK-NESS (μm) | 1 GHz | 2 GHz | 3 GHz | | | | |
| COMPARATIVE EXAMPLE 1 | 0402 | 2 | Cu | 4 | 7 | Cu | 4 | Sn | 2.5 | 480 | 160 | 85 | ○ | ○ | × | - |
| COMPARATIVE EXAMPLE 2 | 0402 | 2 | Cu | 4 | 7 | Cu | 3 | Sn | 2.5 | 480 | 160 | 85 | ○ | ○ | × | - |
| COMPARATIVE EXAMPLE 3 | 0402 | 2 | Cu | 4 | 7 | Cu | 2 | Sn | 2.5 | 480 | 160 | 85 | ○ | ○ | × | - |
| COMPARATIVE EXAMPLE 4 | 0402 | 2 | Cu | 6 | 7 | Cu | 6 | Sn | 2.5 | 480 | 160 | 85 | ○ | ○ | × | - |
| COMPARATIVE EXAMPLE 5 | 0402 | 2 | Cu | 6 | 7 | Cu | 4 | Sn | 2.5 | 480 | 160 | 85 | ○ | ○ | × | - |
| COMPARATIVE EXAMPLE 6 | 0402 | 2 | Cu | 6 | 7 | Cu | 3 | Sn | 2.5 | 480 | 160 | 85 | ○ | ○ | × | - |
| COMPARATIVE EXAMPLE 7 | 0402 | 2 | Cu | 10 | 7 | Cu | 10 | Sn | 2.5 | 480 | 160 | 85 | ○ | ○ | × | - |
| COMPARATIVE EXAMPLE 8 | 0603 | 2 | Cu | 10 | 7 | Cu | 7 | Sn | 2.5 | 530 | 190 | 95 | ○ | ○ | × | - |
| COMPARATIVE EXAMPLE 9 | 1005 | 2 | Cu | 10 | 7 | Cu | 5 | Sn | 2.5 | 540 | 200 | 95 | ○ | ○ | × | - |
| COMPARATIVE EXAMPLE 10 | 1608 | 2 | Cu | 4 | 7 | Cu | 6 | Sn | 2.5 | 560 | 220 | 90 | ○ | ○ | × | - |
| COMPARATIVE EXAMPLE 11 | 0402 | 2 | Cu | 6 | 7 | Cu | 8 | Sn | 2.5 | 480 | 160 | 85 | ○ | ○ | × | - |

FIG. 5

| | SHAPE LENGTH WIDTH (mm) | ELECTRO-STATIC CAPACI-TANCE (pF) (1MHz) | BASE CONDUCTIVE LAYER | | | 1ST PLATED FILM | | 2ND PLATED FILM | | Q VALUE | | | QUALITY OF HIGH FREQUENCY CHARACTE-RISTIC | SEAL PROPER-TY OF ELECT-RODE | QUALITY OF PLATING | QYALITY OF MOUN-TING |
|---|---|---|---|---|---|---|---|---|---|---|---|---|---|---|---|---|
| | | | MATE-RIAL | THICK-NESS (μm) | GLASS (PART) | MATE-RIAL | THICK-NESS (μm) | MATE-RIAL | THICK-NESS (μm) | 1 GHz | 2 GHz | 3 GHz | | | | |
| COMPARATIVE EXAMPLE 12 | 0402 | 2 | Cu | 4 | 3 5 6 7 | Cu | 1 | Sn | 2.5 | 480 | 160 | 85 | ○ | △ | ○ | × |
| COMPARATIVE EXAMPLE 13 | 0402 | 2 | Cu | 6 | 3 5 6 7 | Cu | 2 | Sn | 2.5 | 480 | 160 | 85 | ○ | ○ | ○ | × |
| COMPARATIVE EXAMPLE 14 | 0402 | 2 | Cu | 6 | 3 5 6 7 | Ni | 3 | Sn | 2.5 | 330 | 110 | 60 | × | ○ | ○ | × |
| COMPARATIVE EXAMPLE 15 | 0402 | 2 | Ni | 6 | 3 5 6 7 | Cu | 2 | Sn | 2.5 | 220 | 100 | 55 | × | △ | × | — |
| COMPARATIVE EXAMPLE 16 | 0402 | 2 | Ni | 6 | 3 5 6 7 | Cu | 4 | Sn | 2.5 | 220 | 100 | 55 | × | ○ | ○ | × |

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2016-109211, filed on May 31, 2016, the entire contents of which are incorporated herein by reference.

FIELD

A certain aspect of the present invention relates to a multilayer ceramic capacitor and a manufacturing method of the multilayer ceramic capacitor.

BACKGROUND

Japanese Patent Application Publication No. 2001-274035 discloses a technology in which a conductive paste for external electrodes including a conductive component and a glass frit of which amount is 5 to 50 weight % with respect to total of the conductive component and the glass frit is used in order to prevent intrusion of a plating solution, in a multilayer ceramic capacitor including a base metal such as Cu, Ni or the like for internal electrodes and external electrodes.

When an external electrode paste lacks glass, a problem may occur in a seal property of a chip. Alternatively, when an excessive amount of glass is added, inferior plating caused by surface elution of the glass may occur after sintering of a metal. And so, Japanese Patent Application Publication No. 2013-048231 discloses a technology for solving the problems, in which an external electrode paste includes conductive metal grains having an average grain size of 0.3 μm or less by 10 to 90 weight part and an amount of glass with respect to the conductive metal grains is 0.3 to 2.0. On the other hand, Japanese Patent Application Publication No. 2014-011449 discloses a technology for solving the problems, in which an average of a longitudinal length of glass included in an external electrode is 10 μm or less.

SUMMARY OF THE INVENTION

According to an aspect of the present invention, there is provided a multilayer ceramic capacitor including: a ceramic multilayer structure designated to have ceramic dielectric layers and internal electrode layers alternately stacked, the internal electrode layers being mainly composed of a transition metal other than an iron group, end edges of the internal electrode layers being alternately exposed to a first end face and a second end face of the ceramic multilayer structure; and at least a pair of external electrodes that are provided on the first end face and the second end face of the ceramic multilayer structure, wherein the external electrode includes a base conductive layer directly contacting the ceramic multilayer structure and a first plated film covering the base conductive layer, the base conductive layer including glass of less than 7 weight % and being mainly composed of a transition metal other than an iron group or a noble metal, the first plated film having a thickness that is half of a thickness of the base conductive layer or more and being mainly composed of a transition metal other than an iron group.

According to another aspect of the present invention, there is provided a manufacturing method of a multilayer ceramic capacitor including: alternately stacking ceramic dielectric layer green sheets and conductive pastes for internal electrodes, the conductive pastes for internal electrodes being mainly composed of a transition metal other than an iron group; forming a ceramic multilayer structure by exposing the conductive pastes for internal electrodes stacked by the stacking to a first end face and a second end face different from the first end face alternately; calcining the ceramic multilayer structure; arranging a conductive paste on the first end face and the second end face of the ceramic multilayer structure after the calcining, the conductive paste being mainly composed of a transition metal, other than an iron group, that includes glass of less than 7 weight % or a noble metal; baking a base conductive layer by thermally treating the conductive paste; and forming a first plated film that covers the base conductive layer, has a thickness of half of the thickness of the base conductive layer or more, and is mainly composed of a transition metal other than the iron group.

BRIEF DESCRIPTION OF THE DRAWINGS

FIG. 3 illustrates characteristic results of examples;

FIG. 4 illustrates characteristic results of comparative examples; and

FIG. 5 illustrates characteristic results of comparative examples.

DETAILED DESCRIPTION

When a base electrode includes glass, the glass tends to be segregated at the surface of the base electrode. When a moisture component such as plating solution remains in a void generated by dropping of the segregated glass or elution of the segregated glass into a plating solution, a solder splitting phenomenon tends to occur. In order suppress the solder splitting phenomenon, it is necessary to form a metal plated film. When affinity with respect to the solder during a mounting is considered, a Ni-plating is generally used for the metal plated film. In order to suppress the solder splitting phenomenon, it is preferable that a Ni-plated film has a large thickness. On the other hand, when electrical characteristics of a high frequency band are considered, a resistance increases because of a skin effect of the high frequency band in a case where the iron group transition metal such as Ni having a high relative permeability exists on a signal line. In this case, a dielectric loss may increase.

A description will be given of an embodiment with reference to the accompanying drawings.

Embodiment

Figure 1A:
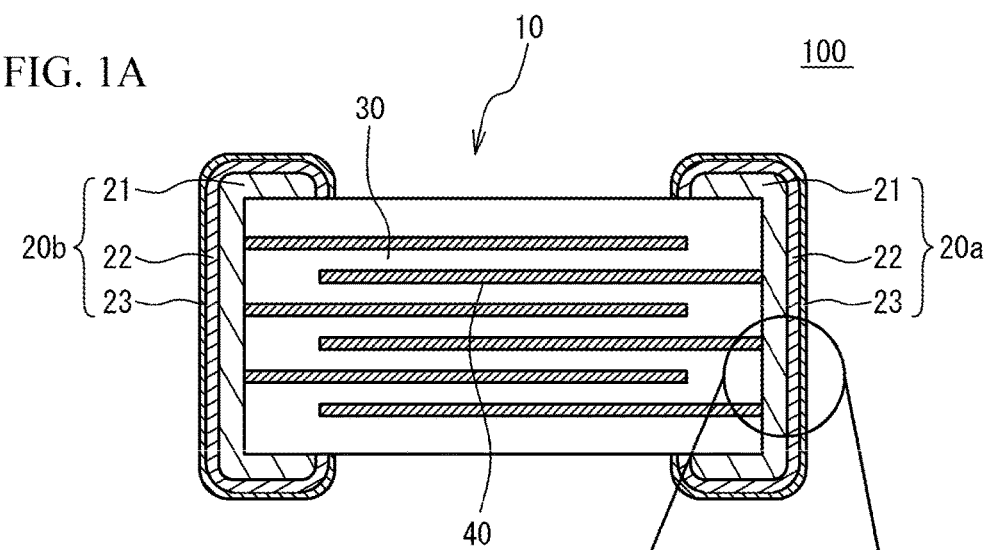
FIG. 1A and FIG. 1B illustrate a multilayer ceramic capacitor in accordance with an embodiment.
Figure 1B:
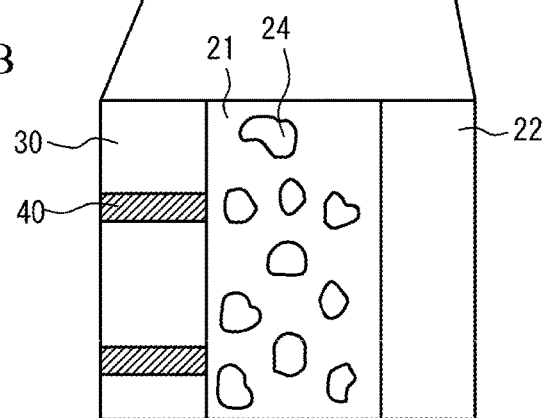

FIG. 1A and FIG. 1B illustrate a multilayer ceramic capacitor 100 in accordance with an embodiment. The multilayer ceramic capacitor 100 illustrated in FIG. 1A and FIG. 1B is one example. Therefore, the multilayer ceramic capacitor 100 may be applied to shapes other than that of FIG. 1A and FIG. 1B. The multilayer ceramic capacitor 100 may be used for an array.

As illustrated in FIG. 1A, the multilayer ceramic capacitor 100 includes a ceramic multilayer structure 10 having a rectangular parallelepiped shape, and at least a pair of external electrodes 20*a* and 20*b*. The ceramic multilayer structure 10 has a structure designed to have ceramic dielectric layers 30 and internal electrode layers 40 alternately stacked. End edges of the internal electrode layers 40 are alternately exposed to a first end face of the ceramic multilayer structure 10 and a second end face of the ceramic multilayer structure 10 that is different from the first end face. In the embodiment, the first face faces with the second face. The external electrode 20*a* is provided on the first end face. The external electrode 20*b* is provided on the second end face.

The ceramic dielectric layer 30 is mainly composed of a ceramic material having a perovskite structure expressed by a general expression $ABO_3$. The perovskite structure includes $ABO_{3-\alpha}$ having an off-stoichiometric composition. For example, the ceramic material may be $CaZrO_3$ (calcium zirconate), $BaTiO_3$ (barium titanate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure and so on.

The internal electrode layer 40 is a conductive thin film that is mainly composed of a transition metal component such as Cu other than iron group (Fe, Co and Ni).

The external electrodes 20*a* and 20*b* have a base conductive layer 21, a first plated film 22 and a second plated film 23. The base conductive layer 21 directly contacts the ceramic multilayer structure 10. The first plated film 22 directly contacts the base conductive layer 21 and covers the base conductive layer 21. The second plated film 23 directly contacts the first plated film 22 and covers the first plated film 22. The base conductive layer 21 includes glass and is mainly composed of a transition metal such as Cu other than an iron group, or a noble metal such as Ag, Au, Pt, or Pd. A preferable high frequency characteristics can be achieved, because the base conductive layer 21 is mainly composed of the transition metal other than the iron group, or the noble metal. For example, the base conductive layer 21 has a thickness of approximately 4 μm to 10 μm.

FIG. 1B illustrates an enlarged view of the base conductive layer 21. As illustrated in FIG. 1B, glass 24 is dispersed in the base conductive layer 21. The glass 24 of the base conductive layer 21 becomes hardened, after softening during the baking of the base conductive layer 21 to the ceramic multilayer structure 10. Therefore, the glass 24 achieves adhesiveness between the base conductive layer 21 and the ceramic multilayer structure 10. When an amount of the glass in the base conductive layer 21 is large, discontinuity may occur in the first plated film 22. And so, the base conductive layer 21 includes the glass of less than 7 weight %. The glass is not limited specifically. The glass is amorphous material including one or more network formation oxides and one or more network modification oxides. For example, $B_2O_3$, $SiO_2$ or the like can be used as the network formation oxide. $Al_2O_3$, ZnO, CuO, $Li_2O$, $Na_2O$, $K_2O$, MgO, CaO, BaO, $ZrO_2$, $TiO_2$ or the like can be used as the network modification oxide.

In the base conductive layer 21, the glass 24 tends to be segregated at an outer surface thereof. In this case, in the base conductive layer 21, a moisture component such as a plating solution may remain in a void generated by dropping of the glass 24, a void generated by elution of the glass 24 into the plating solution during the formation of the first plated film 22, or the like. Thus, a solder splitting phenomenon may occur during a solder mounting of the multilayer ceramic capacitor 100. And so, the first plated film 22 has a thickness that is a half of the thickness of the base conductive layer 21 or more. In this case, the first plated film 22 has a sufficient thickness. Therefore, the solder splitting phenomenon may be suppressed. The segregation amount of the glass 24 to the surface of the base conductive layer 21 gets larger, when the base conductive layer 21 is thick. When the first plated film 22 gets thicker as the base conductive layer 21 gets thicker, the solder splitting phenomenon can be suppressed. And so, an absolute value of the thickness of the first plated film 22 is not regulated. However, the first plated film 22 has the thickness that is half of the thickness of the base conductive layer 21 or more, as a relative value with respect to the thickness of the base conductive layer 21.

When an affinity with respect to the solder used for the mounting of the multilayer ceramic capacitor 100 is considered, it is preferable that a Ni-plating is used for the formation of the first plated film 22. However, when electrical characteristic of a high frequency band is considered, a resistance increases because of a skin effect of the high frequency band in a case where the iron group transition metal such as Ni having a high relative permeability exists on a signal line. In this case, a dielectric loss may increase. And so, in the embodiment, the transition metal such as Cu other than the iron group is used as the main component of the first plated film 22. It is therefore possible to reduce the dielectric loss in the high frequency band.

The second plated film 23 is mainly composed of another transition metal other than the iron group that is different from the transition metal of the first plated film 22. For example, when the affinity with respect to the solder used for the mounting of the multilayer ceramic capacitor 100 is considered, it is preferable that the second plated film 23 is mainly composed of a transition metal such as Sn.

Figure 2:
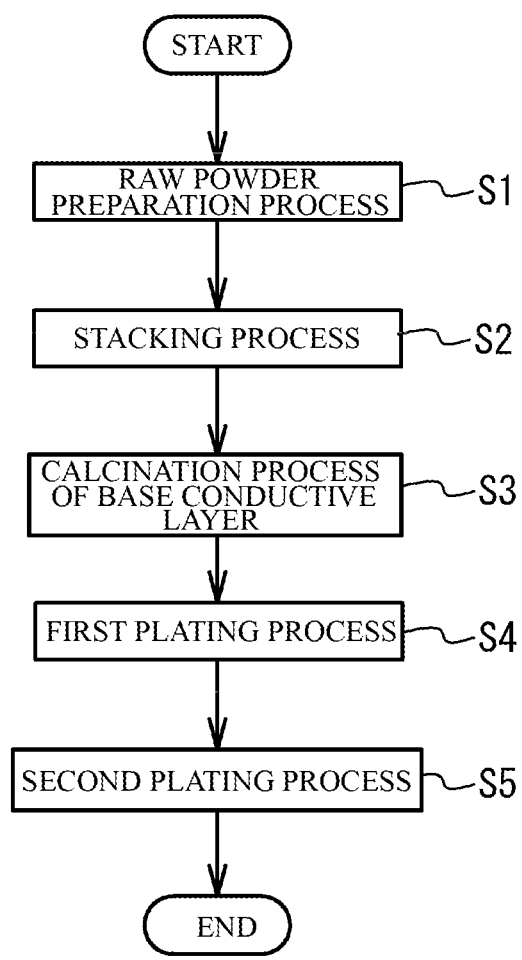
FIG. 2 is a flowchart illustrating a method of manufacturing a multilayer ceramic capacitor.

A description will next be given of a manufacturing method of the multilayer ceramic capacitor 100. FIG. 2 is a flowchart illustrating a method of manufacturing the multilayer ceramic capacitor 100.

Raw Powder Preparation Process

First, specified additive compounds may be added to ceramic material powder that is the main component of the ceramic dielectric layer 30 according to the purpose. The examples of the additive compounds include Mg, Mn, V, Cr, oxidation materials of rare-earth elements (Y, Dy, Tm, Ho, Tb, Yb, and Er), and oxidation materials of Sm, Eu, Gd, Co, Ni, Li, B, Na, K, and Si, or glass. For example, a compound including the additive compounds is added to the ceramic material powder, and the resulting compound is calcined. Next, the resulting ceramic material grains are wet blended with the additive compound, dried and ground to prepare ceramic material powder.

Next, a binder such as polyvinyl butyral (PVB) resin, an organic solvent such as ethanol or toluene, and a plasticizer such as dioctyl phthalate (DOP) are added to the resulting ceramic material powder and wet-blended. With use of the resulting slurry, a strip-shaped dielectric green sheet substance with a thickness of 0.8 μm or less is coated on a base material by, for example, a die coater method or a doctor blade method, and then dried.

Stacking Process

Then, a conductive paste for the internal electrode is printed on the surface of the dielectric green sheet by screen printing or gravure printing to arrange patterns of the internal electrode layers 40. The conductive paste for the internal electrode includes powder of the main component metal of the internal electrode layer 40, a binder, a solvent and an auxiliary agent as needed. It is preferable that the binder and the solvent are different from those of the ceramic slurry. The ceramic material that is the main component of the ceramic dielectric layer 30 may be dispersed into the conductive paste for the internal electrode, as a co-material.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 40 and the ceramic dielectric layers 30 are alternated with each other and the end edges of the internal electrode layers 40 are alternately exposed to both end faces in the length direction of the dielectric layer so as to be alternately led out to a pair of external electrodes of different polarizations. Thereby, a layered product having a rectangular parallelepiped shape is obtained. Dielectric green sheet, which are to be the cover layers, are stacked on the layered product and under the layered product.

Calcination Process

Next, the resulting compact is calcined for approximately two hours at a temperature of approximately 950 degrees C. in a reducing atmosphere of which $H_2$ volume % is approximately 1.5. Thus, the ceramic dielectric layer 30 and the internal electrode layer 40 can be calcined. Thereby, a sintered structure is obtained.

Baking Process of the Base Conductive Layer 21

Next, a conductive paste for the base conductive layer is coated on the two end faces to which the internal electrode layer patterns of the resulting sintered structure are exposed. The conductive paste for the base conductive layer includes powder of the main component metal of the base conductive layer 21, a binder, a solvent, and an auxiliary agent as needed. The binder and the solvent may be the same as those of the above-mentioned ceramic paste. And a sintering agent forming glass is dispersed in the conductive paste for the base conductive layer in order to achieve sealing property of the base conductive layer 21 to the ceramic multilayer structure 10. The amount of the sintering agent in the conductive paste for the base conductive layer is of less than 7 weight %. One or more network formation oxides selected from $B_2O_3$ and $SiO_2$ and one or more network modification oxides selected from $Al_2O_3$, ZnO, CuO, $Li_2O$, $Na_2O$, $K_2O$, MgO, CaO, BaO, $ZrO_2$ and $TiO_2$ are used as the sintering agent. And the resulting coated structure is calcined at a temperature lower than the temperature for obtaining the above-mentioned sintered structure, in a nitrogen atmosphere (for example, 800 degrees C. to 900 degrees C.). Thus, the base conductive layer 21 baked. And a semi-product of the multilayer ceramic capacitor 100 can be obtained. In order to uniformly disperse the glass in the base conductive layer 21, it is preferable that the sintering agent has a small size. When the glass of the base conductive layer 21 is excessively large, defect such as the glass segregation or the void may occur. And so, it is preferable that a grain size of the sintering agent is equal to or less than that of the above-mentioned main component metal. It is more preferable that the grain size of the sintering agent is half of that of the above-mentioned main component metal or less.

First Plating Process and Second Plating Process

Next, the first plated film 22 is formed on the base conductive layer 21 of the semi-product by an electrolytic plating. In the process, the electrolytic plating is performed so that the thickness T of the first plated film 22 satisfies a relation of $t/2 \leq T$ with respect to the thickness t of the base conductive layer 21. In order to suppress the grown in size of the multilayer ceramic capacitor 100, it is preferable that the thickness t is adjusted to satisfy a relation of $t/2 \leq T \leq t$. Moreover, the second plated film 23 is formed on the first plated film 22 by an electrolytic plating.

In the embodiment, the base conductive layer 21 includes the glass of less than 7 weight %. In this case, it is possible to suppress the discontinuity of the first plated film 22 and achieve the preferable adhesiveness of the base conductive layer 21 to the ceramic multilayer structure 10. In order to suppress the discontinuity of the first plated film 22, it is preferable that the amount of the glass in the base conductive layer 21 is less than 6 weight %. In order to achieve the adhesiveness of the base conductive layer 21 to the ceramic multilayer structure 10, it is preferable that the amount of the glass in the base conductive layer 21 is more than 2 weight %. It is more preferable that the amount is equal to or more than 3 weight %. And, the first plated film 22 has the thickness T satisfying the relation of $t/2 \leq T$ with respect to the thickness t of the base conductive layer 21. Therefore, the first plated film 22 is sufficiently thick. Thus, the solder splitting phenomenon can be suppressed. In order to reduce the size of the multilayer ceramic capacitor 100, it is preferable that the thickness T satisfies the relation of $t/2 \leq T \leq t$. The base conductive layer 21 is mainly composed of the transition metal other than the iron group or the noble metal. And, the first plated film 22 and the second plated film 23 are mainly composed of the transition metal other than the iron group. Therefore, the dielectric loss in the high frequency band can be reduced.

EXAMPLES

The multilayer ceramic capacitors were manufactured in accordance with the embodiment. And characteristic of the multilayer ceramic capacitors was measured.

Examples 1 to 11

The multilayer ceramic capacitors 100 were manufactured in accordance with the embodiment.

$CaZrO_3$ was used as the ceramic material that is the main component of the ceramic dielectric layer 30. A molar ratio of Zr to Ca (Ca/Zr) was 1.05. BN (3.5 mol %), $SiO_2$ (3.5 mol %), $Li_2CO_3$ (1.75 mol %) and $MnCO_3$ (3.5 mol %) were added to the ceramic dielectric layer 30 as the additive material. Cu was used as the main component of the internal electrode layer 40. Cu was used as the main component of the base conductive layer 21 of the external electrodes 20a and 20b. BaO—ZrO based glass component was added to the base conductive layer 21 by 3 to 6 weight part as the sintering agent. Cu was used as the first plated film 22. In any of the examples 1 to 11, the thickness of the first plated film 22 is half of the thickness of the base conductive layer 21 or more. Sn was used as the second plated film 23. In any of the examples 1 to 11, the thickness of the second plated film 23 was 2.5 µm.

FIG. 3 to FIG. 5 illustrate an approximate shape, an electrostatic capacitance, a thickness of the base conductive layer 21, a thickness of the first plated film 22, a thickness of the second plated film 23, high frequency characteristic (Q value), quality of high frequency characteristic, sealing property of electrodes, quality of plating, and mounting quality of the multilayer ceramic capacitor 100. The sealing property of electrodes is the sealing property of the external electrodes 20a and 20b. A test of the sealing property was performed in accordance with adhesiveness test of IEC60068-2-21. In the test, a pressure is added to a product so that the product is peeled from a substrate. When the product is peeled from the substrate, a destruction mode is confirmed. When the first plated film 22 is peeled from the base conductive layer 21, it is determined as "◯". When the base conductive layer 21 is peeled from the sintered structure of the ceramic dielectric layer 30 and the internal electrode layer 40, it is determined as "Δ". The quality of plating is a plating quality of the first plated film 22 with respect to the base conductive layer 21. When the end face is confirmed with visual contact after formation of the first plated film 22 and there is discontinuity of the plating such as a pin hole, it is determined as "X". When a whole face is covered with the plated film, it is determined as "◯". Regarding the mounting quality, it is determined as "◯", when the solder splitting phenomenon does not occur during the mounting of the multilayer ceramic capacitor 100. When the solder splitting phenomenon occurs during the mounting, it is determined as "X".

In a comparative example 1, BaO—ZnO based glass was added by 7 weight part as the sintering agent. Other conditions were the same as the example 1.

In a comparative example 2, BaO—ZnO based glass was added by 7 weight part as the sintering agent. Other conditions were the same as the example 2.

In a comparative example 3, BaO—ZnO based glass was added by 7 weight part as the sintering agent. Other conditions were the same as the example 3.

In a comparative example 4, BaO—ZnO based glass was added by 7 weight part as the sintering agent. Other conditions were the same as the example 4.

In a comparative example 5, BaO—ZnO based glass was added by 7 weight part as the sintering agent. Other conditions were the same as the example 5.

In a comparative example 6, BaO—ZnO based glass was added by 7 weight part as the sintering agent. Other conditions were the same as the example 6.

In a comparative example 7, BaO—ZnO based glass was added by 7 weight part as the sintering agent. Other conditions were the same as the example 7.

In a comparative example 8, BaO—ZnO based glass was added by 7 weight part as the sintering agent. Other conditions were the same as the example 8.

In a comparative example 9, BaO—ZnO based glass was added by 7 weight part as the sintering agent. Other conditions were the same as the example 9.

In a comparative example 10, BaO—ZnO based glass was added by 7 weight part as the sintering agent. Other conditions were the same as the example 10.

In a comparative example 11, BaO—ZnO based glass was added by 7 weight part as the sintering agent. Other conditions were the same as the example 11.

In a comparative example 12, the thickness of the base conductive layer 21 was 4 μm. The thickness of the first plated film 22 was 1 μm. BaO—ZnO based glass was added by 3 to 7 weight part as the sintering agent. Other conditions were the same as the examples 1 to 11.

In a comparative example 13, the thickness of the base conductive layer 21 was 6 μm. The thickness of the first plated film 22 was 2 μm. BaO—ZnO based glass was added by 3 to 7 weight part as the sintering agent. Other conditions were the same as the examples 1 to 11.

In a comparative example 14, the thickness of the base conductive layer 21 was 6 μm. The thickness of the first plated film 22 was 3 μm. Ni was used as the first plated film 22. BaO—ZnO based glass was added by 3 to 7 weight part as the sintering agent. Other conditions were the same as the examples 1 to 11.

In a comparative example 15, the thickness of the base conductive layer 21 was 6 μm. The thickness of the first plated film 22 was 2 μm. Ni was used as the base conductive layer 21. BaO—ZnO based glass was added by 3 to 7 weight part as the sintering agent. Other conditions were the same as the examples 1 to 11.

In a comparative example 16, the thickness of the base conductive layer 21 was 6 μm. The thickness of the first plated film 22 was 4 μm. Ni was used as the base conductive layer 21. BaO—ZnO based glass was added by 3 to 7 weight part as the sintering agent. Other conditions were the same as the examples 1 to 11.

As illustrated in FIG. 3, in any of the examples 1 to 11, the preferable electrode adhesiveness and the preferable plating quality are achieved. This is because the base conductive layer 21 included the glass component of less than 7 weight %. Next, as illustrated in FIG. 3, the preferable mounting quality is achieved in any of the examples 1 to 11. This is because the thickness of the first plated film 22 was half of that of the base conductive layer 21 or more and the first plated film 22 was sufficiently thick. And the preferable high frequency characteristic is achieved in the examples 1 to 11. This is because the transition metal (Cu) other than the iron group transition metal was used as the base conductive layer 21, the first plated film 22 and the second plated film 23.

On the other hand, as illustrated in FIG. 4, in the comparative examples 1 to 11, the preferable plating quality is not achieved because the weight part of the glass component was 7. This is because the amount of the glass in the base conductive layer 21 was large, and the discontinuity occurred in the first plated film 22.

As illustrated in FIG. 5, in the comparative examples 12 and 13, the solder splitting phenomenon occurred during the solder mounting. This is because the thickness of the first plated film 22 was less than half of that of the base conductive layer 21, the first plated film 22 was not sufficiently thick, and the remaining of the moisture component in the void of the base conductive layer 21 was not suppressed.

Next, in the examples 1 to 11, the preferable high frequency characteristic is achieved. This is because the transition metal (Cu) other than the iron group transition metal was used as the base conductive layer 21 and the first plated film 22.

On the other hand, in the comparative examples 14 to 16, the preferable high frequency characteristic is not achieved. This is because the iron group transition metal Ni was used as one of the base conductive layer 21 and the first plated film 22.

Although the embodiments of the present invention have been described in detail, it is to be understood that the various change, substitutions, and alterations could be made hereto without departing from the spirit and scope of the invention.

What is claimed is:

1. A manufacturing method of a multilayer ceramic capacitor comprising:
   alternately stacking ceramic dielectric layer green sheets and conductive pastes for internal electrodes, the conductive pastes for internal electrodes being mainly composed of a transition metal other than an iron group;
   forming a ceramic multilayer structure by exposing the conductive pastes for internal electrodes stacked by the stacking to a first end face and a second end face different from the first end face alternately;
   calcining the ceramic multilayer structure;
   arranging a conductive paste on the first end face and the second end face of the ceramic multilayer structure after the calcining, wherein a main component metal of the conductive paste is one of a transition metal other than an iron group or a noble metal, the conductive paste includes a sintering agent which becomes glass when being baked, and a grain diameter of the sintering agent is half of a grain diameter of the main component metal or less, baking a base conductive layer by thermally treating the conductive paste so that the glass derived from the sintering agent is segregated on a surface of the base conductive layer that is opposite to the ceramic multilayer structure; and forming an external electrode by forming at least a first plated film and a second plated film, wherein an amount of the glass in the base conductive layer is less than 7 weight %, wherein the first plated film that covers the base conductive layer, has a thickness of half of the thickness of the base conductive layer or more, and is mainly composed of a transition metal other than the iron group, wherein the second plated film that covers the first plated film and is mainly composed of a transition metal that is different from the transition metal of the base conductive layer and is other than an iron group, wherein a Sn-plated layer is formed as an outermost plated layer of the external electrode, wherein the external electrode does not include any plated layer whose main component is an iron group metal.

* * * * *